(12) United States Patent
Zhao et al.

(10) Patent No.: US 11,057,821 B2
(45) Date of Patent: Jul. 6, 2021

(54) METHOD AND DEVICE FOR CONNECTING TO HIDDEN WIRELESS ACCESS POINT

(71) Applicant: SHANGHAI ZHANGMEN SCIENCE AND TECHNOLOGY CO., LTD., Shanghai (CN)

(72) Inventors: Yongliang Zhao, Shanghai (CN); Xiyi Yin, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/702,798

(22) Filed: Dec. 4, 2019

(65) Prior Publication Data

US 2020/0107242 A1    Apr. 2, 2020

Related U.S. Application Data

(63) Continuation of application No. PCT/CN2018/089641, filed on Jun. 1, 2018.

(30) Foreign Application Priority Data

Jun. 8, 2017 (CN) .......................... 201710431195.9

(51) Int. Cl.
*H04W 40/24* (2009.01)
*H04W 76/11* (2018.01)
(Continued)

(52) U.S. Cl.
CPC ......... *H04W 40/246* (2013.01); *H04W 12/06* (2013.01); *H04W 76/11* (2018.02); *H04W 80/02* (2013.01)

(58) Field of Classification Search
CPC ..... H04W 84/12; H04W 88/06; H04W 48/14; H04W 4/02; H04W 64/003; H04W 28/08;
(Continued)

(56) References Cited

U.S. PATENT DOCUMENTS 8,116,287 B2    2/2012 Krantz et al.
2007/0243873 A1*  10/2007 Jin ........................ H04W 36/06
455/436
(Continued)

FOREIGN PATENT DOCUMENTS

CN    105025472 A    11/2015
CN    106572465 A     4/2017
CN    107182053 A     9/2017

*Primary Examiner* — Kwasi Karikari
(74) *Attorney, Agent, or Firm* — Bayramoglu Law Offices LLC

(57) ABSTRACT

A method and a device for connecting to a hidden wireless access point, where a wireless routing device broadcasts a visible wireless access point to a user device, and the wireless access point has a corresponding hidden wireless access point; the user device obtains identification information and MAC address information of the visible wireless access point by scanning, and thereby acquires identification information of the hidden wireless access point corresponding to the visible wireless access point; and then, the user device sends a connection request with respect to the hidden wireless access point to the wireless routing device, and if the connection request is successfully authenticated, the user device is successfully connected to the hidden wireless access point.

11 Claims, 3 Drawing Sheets

(51) Int. Cl.
*H04W 12/06* (2021.01)
*H04W 80/02* (2009.01)

(58) Field of Classification Search
CPC ..... H04W 24/02; H04W 88/08; H04W 48/18; H04W 48/20; H04W 76/10; H04W 76/11; H04W 76/15; H04W 76/27; H04W 88/02; H04W 8/08; H04W 92/10; H04W 92/20; H04W 36/0016; H04W 36/0022; H04W 36/08; H04W 28/18; H04W 36/0061; H04W 40/36
See application file for complete search history.

(56) References Cited

U.S. PATENT DOCUMENTS

2007/0253353 A1* 11/2007 Korus ................... H04W 8/26
 370/328
2008/0198811 A1* 8/2008 Deshpande ........... H04W 48/16
 370/332

* cited by examiner

METHOD AND DEVICE FOR CONNECTING TO HIDDEN WIRELESS ACCESS POINT

CROSS REFERENCE TO THE RELATED APPLICATIONS

This application is the continuation application of International Application No. PCT/CN2018/089641, filed on Jun. 1, 2018, which is based upon and claims priority to Chinese Patent Applications No. 201710431195.9 filed on Jun. 8, 2017, the entire contents of which are incorporated herein by reference.

TECHNICAL FIELD

The present application relates to the field of communications, and in particular, to a technology for connecting to a hidden wireless access point.

BACKGROUND

Users may want to hide Service Set Identifiers (SSIDs) of wireless access points of their own wireless routers to prevent the free usage of networks by others, guaranteeing network speeds, and to prevent malicious users from accessing to named access points. However, hiding the wireless access points may also hinder the normal use of ordinary users. Therefore, the industry currently provides some solutions for connecting to hidden wireless access points. For example, a defined hidden SSID is added by a user to a wireless list in advance, and then is authenticated for connection. However, these existing technical solutions all are not adequately intelligent, and the user experience needs to be optimized.

SUMMARY

An objective of the present application is to provide a method and a device for connecting to a hidden wireless access point.

According to an aspect of the present application, there is provided a method for connecting to a hidden wireless access point on a user device end, wherein the method includes: acquiring identification information of the hidden wireless access point corresponding to a visible wireless access point according to identification information and media access control (MAC) address information of the visible wireless access point obtained by a user device from scanning; sending a connection request with respect to the hidden wireless access point to a wireless routing device corresponding to the visible wireless access point, wherein the connection request includes the identification information of the hidden wireless access point; and receiving connection response information sent by the wireless routing device.

According to another aspect of the present application, there is provided a user device for connecting to a hidden wireless access point, wherein the user device includes: a processor; and a memory configured to store computer executable instructions that, when executed, cause the processor to perform the method as described above.

According to still another aspect of the present application, there is provided a method for connecting to a hidden wireless access point on a wireless routing device end, wherein the method includes: broadcasting a visible wireless access point to a user device, wherein the visible wireless access point has a corresponding hidden wireless access point; acquiring a connection request with respect to the hidden wireless access point sent by the user device, wherein the connection request includes identification information of the hidden wireless access point; and sending connection response information to the user device based on an authentication result.

According to still another aspect of the present application, there is provided a wireless routing device for connecting to a hidden wireless access point, wherein the wireless routing device includes: a processor; and a memory configured to store computer executable instructions that, when executed, cause the processor to perform the method as described above.

According to still another aspect of the present application, there is provided a method for connecting to a hidden wireless access point, wherein the method includes: broadcasting, by a wireless routing device, a visible wireless access point to a user device, wherein the visible wireless access point has a corresponding hidden wireless access point; acquiring, by the user device, identification information of the hidden wireless access point corresponding to the visible wireless access point according to identification information and media access control (MAC) address information of the visible wireless access point obtained by scanning; sending, by the user device, a connection request with respect to the hidden wireless access point to the wireless routing device corresponding to the visible wireless access point, wherein the connection request includes the identification information of the hidden wireless access point; acquiring, by the wireless routing device, the connection request with respect to the hidden wireless access point sent by the user device; sending, by the wireless routing device, connection response information to the user device based on an authentication result; and receiving, by the user device, the connection response information sent by the wireless routing device.

According to further still another aspect of the present application, there is provided a method for displaying a hidden wireless access point, wherein the method includes: broadcasting, by a wireless routing device, a visible wireless access point to a user device, wherein the visible wireless access point has a corresponding hidden wireless access point; acquiring, by the user device, identification information of the hidden wireless access point corresponding to the visible wireless access point according to identification information and media access control (MAC) address information of the visible wireless access point obtained by scanning; and displaying, by the user device, the identification information of the hidden wireless access point.

According to further still another aspect of the present application, there is provided a computer readable medium comprising instructions that, when executed, cause a system to perform operations of the method as described above.

Compared with the prior art, the wireless routing device of the present application broadcasts a visible wireless access point to the user device, and the wireless access point has a corresponding hidden wireless access point; the user device obtains identification information and MAC address information of the visible wireless access point by scanning, and thereby acquires identification information of the hidden wireless access point corresponding to the visible wireless access point; and then, the user device may send a connection request with respect to the hidden wireless access point to the wireless routing device, and if the connection request is successfully authenticated, the user device may be successfully connected to the hidden wireless access point. The present application simplifies user operations, which is convenient for users to connect to the hidden wireless access point, and optimizes user experience. Further, the present application may display the identification information of the hidden wireless access point for the users to select to connect or not to connect to the hidden wireless access point, which is convenient for the users to connect to the hidden wireless access point and also respects the users' autonomous selection to enhance the user experience.

BRIEF DESCRIPTION OF THE DRAWINGS

Other features, objectives, and advantages of the present application will become more apparent by reading a detailed description of non-restrictive embodiments made with reference to the following accompanying drawings.

The same or similar reference numerals in the accompanying drawings denote the same or similar components.

DETAILED DESCRIPTION OF THE EMBODIMENTS

The present application will be further described in detail below with reference to the accompanying drawings.

In a typical configuration of the present application, a terminal, a device for a service network, and a trusted party each may include one or more processors (CPUs), input/output interfaces, network interfaces, and memories.

Each memory may include a computer readable medium in the form of a volatile memory, a random access memory (RAM), a non-volatile memory and/or the like, such as a read-only memory (ROM) or a flash memory (Flash RAM). The memory is an example of the computer readable medium.

The computer readable medium includes permanent and non-permanent media and removable and non-removable media; and the computer readable medium may be implemented by any method or technology for information storage. The information may be computer readable instructions, data structures, modules of programs, or other data. A storage medium of a computer may be used for storing information accessible by a computing device, and its examples include, but are not limited to, a phase-change memory (PRAM), a static random access memory (SRAM), a dynamic random access memory (DRAM) or other types of random access memories (RAMs), a read-only memory (ROM), an electrically erasable programmable read-only memory (EEPROM), a flash memory or other memory technologies, a compact disc read-only memory (CD-ROM), a digital versatile disk (DVD) or other optical storages, a cassette magnetic tape, magnetic tape and magnetic disk storages or other magnetic storage devices, or any other non-transmission medium.

Figure 1:
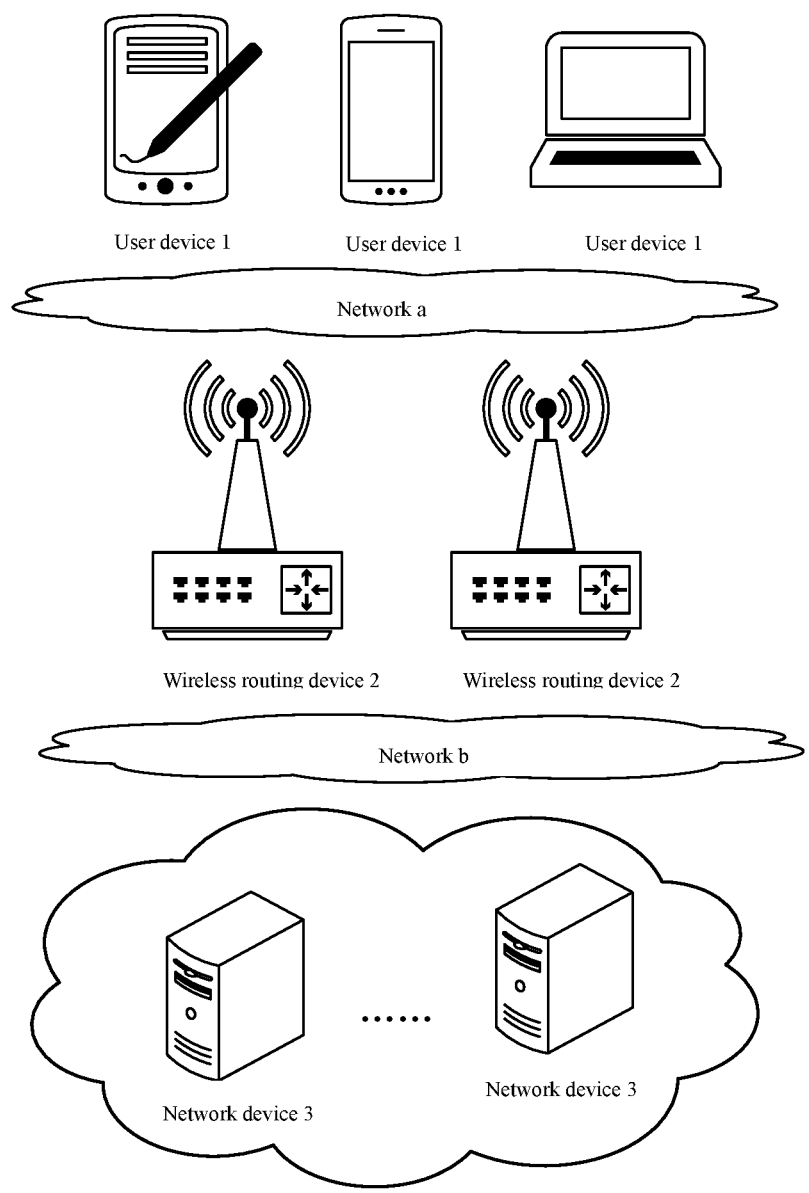
FIG. 1 illustrates a system topology diagram for connecting to a hidden wireless access point according to an embodiment of the present application.

FIG. 1 illustrates a system topology diagram for connecting to a hidden wireless access point according to an embodiment of the present application, and the system includes the user device 1, the wireless routing device 2, and the network device 3.

Here, the user device 1 includes, but is not limited to, any mobile electronic product that can perform human-computer interaction with a user, such as a smart phone, a tablet computer, a notebook computer, etc. The mobile electronic product may adopt any operating system, such as Android operating system, iOS operating system, Windows operating system, etc. The wireless routing device 2 includes a device capable of connecting to various local area networks and wide area networks. Preferably, the wireless routing device 2 is capable of broadcasting a wireless access point to the user device within a certain distance range based on the 802.11 protocol cluster, and providing a wireless local area network as shown by "Network a" in FIG. 1. In some embodiments, the network device 3 may include an electronic device capable of automatically performing numerical calculation and information processing according to instructions set or stored in advance, and its hardware includes, but is not limited to, a microprocessor, an application specific integrated circuit (ASIC), a field-programmable gate array (FPGA), a digital signal processor (DSP), an embedded device, etc. In some embodiments, the network device 3 may include, but is not limited to, a computer, a network host, a single network server, a plurality of network server sets, or a cloud composed of a plurality of servers. Here, the cloud is composed of a large number of computers or network servers based on cloud computing, wherein the cloud computing is a type of distributed computing, and a virtual supercomputer composed of a group of loosely coupled computer sets. "Network b" in FIG. 1 includes, but is not limited to, the Internet, a wide area network, a metropolitan area network, a local area network, a virtual private network (VPN) network, etc.

It should be understood by those skilled in the art that the number of various network elements shown in FIG. 1 for the sake of simplicity may be less than the number in an actual network, but such an omission is on the premise that it does not affect the clear and sufficient disclosure of the present invention. For the sake of brevity, a system composed of the wireless routing device 2 and one user device 1 will be described below as an example.

Figure 2:
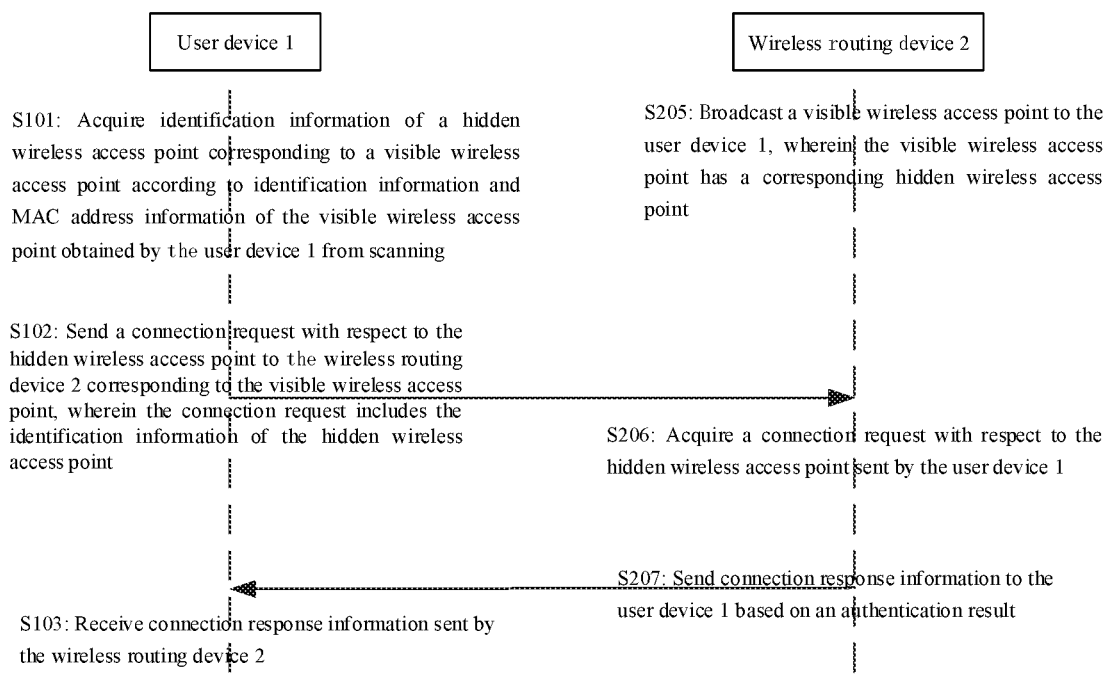
FIG. 2 illustrates a schematic flowchart of a method for connecting to a hidden wireless access point according to another embodiment of the present application.

FIG. 2 illustrates a flowchart of a method for connecting to a hidden wireless access point according to another embodiment of the present application, wherein the method includes step S101, step S102 and step S103 performed on a user device end, and step S205, step S206 and step S207 performed on a wireless routing device end.

Specifically, in step S205, the wireless routing device 2 broadcasts a visible wireless access point to the user device 1, wherein the visible wireless access point has a corresponding hidden wireless access point. In step S101, the user device 1 acquires identification information of the hidden wireless access point corresponding to the visible wireless access point according to identification information and MAC address information of the visible wireless access point obtained by scanning. In step S102, the user device 1 sends a connection request with respect to the hidden wireless access point to the wireless routing device 2 corresponding to the visible wireless access point, wherein the connection request includes the identification information of the hidden wireless access point. In step S206, the wireless routing device 2 acquires the connection request with respect to the hidden wireless access point sent by the user device 1, wherein the connection request includes the identification information of the hidden wireless access point.

Based on an authentication result, in step S207, the wireless routing device 2 sends connection response information to the user device 1. In step S103, the user device 1 receives the connection response information sent by the wireless routing device 2. Herein, the connection response information may indicate that the connection is successful or the connection fails.

For example, the visible wireless access point includes a wireless access point with a visible SSID, and the hidden wireless access point includes a wireless access point that hides the SSID. The wireless routing device 2 broadcasts the visible wireless access point, and at the same time, the wireless routing device 2 also provides but does not broadcast the hidden wireless access point, wherein there is an association relationship between the visible wireless access point and the hidden wireless access point.

A user opens an application on the user device 1, and the application acquires identification information (e.g. the SSID) and MAC address information (e.g. a Basic Service Set Identifier (BSSID)) of the visible wireless access point obtained by the user device 1 from scanning. Then, when the visible wireless access point obtained by the user device 1 from scanning includes a visible wireless access point corresponding to the hidden wireless access point, the application acquires the identification information of the hidden wireless access point. For example, the application generates the identification information (e.g. the SSID) of the hidden wireless access point corresponding to the visible wireless access point according to the association relationship between the visible wireless access point and the hidden wireless access point locally stored by the user device 1. For another example, the application obtains the identification information and the like of the hidden wireless access point by requesting a network device. In a preferred embodiment, the identification information of the hidden wireless access point may further include tag information for indicating classification or content of the hidden wireless access point. For example, an "extreme speed" tag may be added to the hidden wireless access point in the specific application. In some embodiments, the application opened by the user on the user device 1 is a dedicated application that is matched with the wireless routing device 2. For example, a rule has been preset in the dedicated application to enable the dedicated application to identify the visible wireless access point having a corresponding hidden wireless access point, and to obtain identification information of the hidden wireless access point.

Next, the user device 1 may send a connection request with respect to the hidden wireless access point to the wireless routing device 2, wherein the user device 1 may send the connection request to the wireless routing device 2 based on a connection operation of the user, and the user device 1 may also automatically send the connection request to the wireless routing device 2 according to a preset setting. The connection request may include identification information (e.g. the SSID), password information, and the like of the hidden wireless access point.

After acquiring the connection request with respect to the hidden wireless access point sent by the user device 1, the wireless routing device 2 may request the corresponding network device 3 to authenticate the connection request. In another embodiment, the connection request may also be authenticated by the wireless routing device 2.

Based on the authentication result, the wireless routing device 2 sends connection response information to the user device 1. Specifically, if the connection request is successfully authenticated, the wireless routing device 2 sends connection success information to the user device 1, and the user device 1 is successfully connected to the hidden wireless access point.

Preferably, the method further includes: the user device 1 displaying the identification information of the hidden wireless access point, and when a connection operation of the user with respect to the hidden wireless access point is acquired, in step S102, the user device 1 sending a connection request with respect to the hidden wireless access point to the wireless routing device 2 corresponding to the visible wireless access point, wherein the connection request includes the identification information of the hidden wireless access point.

In the present embodiment, the user device 1 generates the identification information of the hidden wireless access point, and then displays the identification information (e.g. SSID and tag information) of the hidden wireless access point. When the connection operation of the user with respect to the hidden wireless access point (e.g. the user clicking the identification information of the hidden wireless access point) is acquired, a connection request with respect to the hidden wireless access point is sent to the wireless routing device 2.

Preferably, in step S101, the user device 1 determines, according to the identification information and the MAC address information of the visible wireless access point obtained by scanning, whether the visible wireless access point has a corresponding hidden wireless access point or not. If it does, the identification information of the hidden wireless access point is generated according to the identification information and the MAC address information of the visible wireless access point.

For example, the user device 1 obtains identification information (e.g. the SSID) and MAC address information (e.g. the BSSID) of one or more visible wireless access points by scanning, wherein the visible wireless access points include the visible wireless access point broadcast by the wireless routing device 2, and also include visible wireless access points broadcast by other wireless routing devices. Herein, only the wireless routing device 2 broadcasts the visible wireless access point having an association relationship with the hidden wireless access point, and the visible wireless access points broadcast by other wireless routing devices do not have corresponding hidden wireless access points.

Preferably, the manner of determining, according to the identification information and the MAC address information of the visible wireless access point obtained by the user device from scanning, whether the visible wireless access point has a corresponding hidden wireless access point or not, includes: determining identity feature information of the visible wireless access point according to the identification information and the MAC address information of the visible wireless access point obtained by the user device from scanning; and determining, according to the identity feature information of the visible wireless access point, whether the visible wireless access point has a corresponding hidden wireless access point or not.

For example, in the above example, if only the wireless routing device 2 broadcasts the visible wireless access point having an association relationship with the hidden wireless access point, and the visible wireless access points broadcast by other wireless routing devices do not have corresponding hidden wireless access points, herein, by determining the identity feature information (e.g. information such as the manufacturer and model of the corresponding wireless routing device) of the visible wireless access point, and distinguishing the wireless routing device 2 from other wireless routing devices, it may be further determined that: if the visible wireless access point is broadcast by the wireless routing device 2, the visible wireless access point has a corresponding hidden wireless access point, and if the visible wireless access point is not broadcast by the wireless routing device 2, the visible wireless access point does not have a corresponding hidden wireless access point.

In a specific embodiment, the information such as the manufacturer and model of the corresponding wireless routing device may be identified to determine the identity feature information of the visible wireless access point according to the MAC address information of the visible wireless access point.

Preferably, in a case where the visible wireless access point has a corresponding hidden wireless access point, the manner of generating the identification information of the hidden wireless access point according to the identification information and the MAC address information of the visible wireless access point, includes: if the visible wireless access point has a corresponding a hidden wireless access point, determining a generative rule of the hidden wireless access point according to the identity feature information of the visible wireless access point; and generating the identification information of the hidden wireless access point according to the identification information and the MAC address information of the visible wireless access point, and the generative rule of the hidden wireless access point.

For example, in the above example, it is assumed that the wireless routing device 2 includes a model A router and a model B router, but the generative rule A' of the hidden wireless access point of the model A router is different from the generative rule B' of the hidden wireless access point of the model B router. Here, the generative rule of the hidden wireless access point is first determined, and then the identification information of the hidden wireless access point is generated according to the corresponding generative rule.

In a specific embodiment, the generative rule of the hidden wireless access point may include, but is not limited to: determining the identification information (e.g. an SSID) of the hidden wireless access point according to the identification information (e.g. an SSID) of the visible wireless access point. For example, it is assumed that the SSID of the visible wireless access point is LinkSure-8888, and according to a predetermined naming rule (for example, "SSID of the hidden wireless access point"=[Pattern]–"SSID of visible wireless access point"), it is obtained that the SSID of the hidden wireless access point corresponding thereto is [Pattern]-LinkSure-8888.

Figure 3:
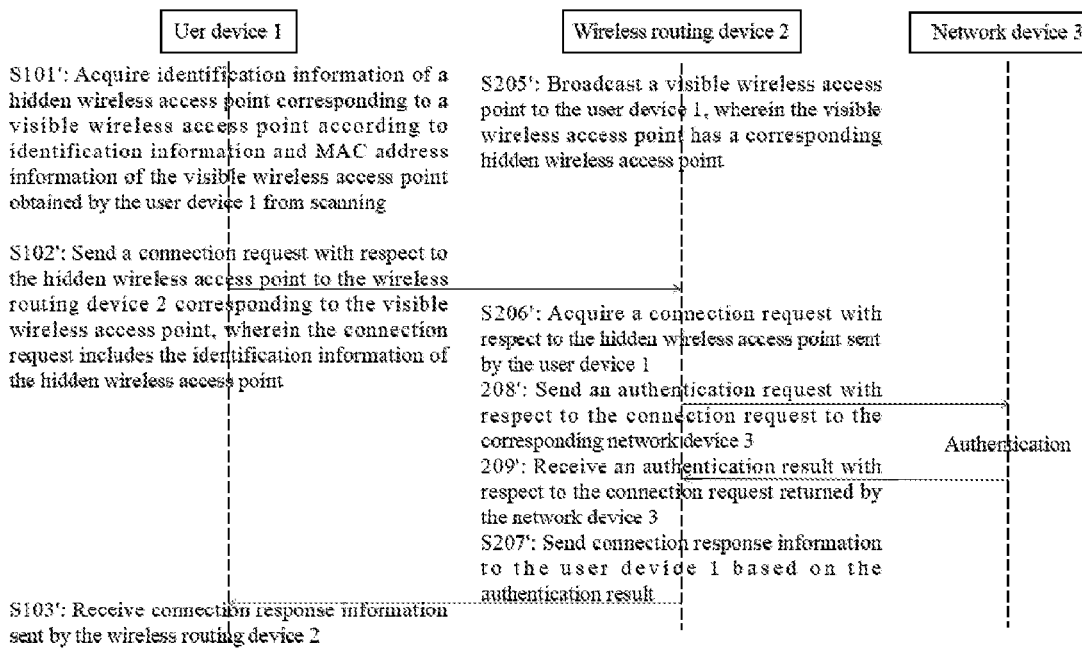
FIG. 3 illustrates a schematic flowchart of a method for connecting to a hidden wireless access point according to still another embodiment of the present application.

Preferably, as shown in FIG. 3, the method further includes step S208' and step S209' performed at the wireless routing device end. In step S208', the wireless routing device 2 sends an authentication request with respect to the connection request to the corresponding network device 3. In step S209', the wireless routing device 2 receives the authentication result with respect to the connection request returned by the network device 3.

In the present embodiment, after acquiring the connection request with respect to the hidden wireless access point sent by the user device 1, the wireless routing device 2 requests the corresponding network device 3 to authenticate the connection request.

For example, when a connection operation of the user with respect to the hidden wireless access point is acquired, the user device 1 obtains request data by processing information such as an identity and a password based on a password authentication protocol (PAP) manner, performs data transmission in a tunneled transport layer security (TTLS) encryption manner, and sends the request data to the wireless routing device 2. The request data is further sent by the wireless routing device 2 to the network device 3. The network device 3 parses the request data processed by the PAP manner after receiving it, forwards to an authentication server of the network device 3 for verification, and returns an authentication result to the wireless routing device 2. Herein, PAP is a link control protocol in a PPP protocol set, and it is mainly to provide a simple method for establishing a peer-to-peer node authentication by using two times of handshakes, which is established on the basis of initial link determination. TTLS is one of commonly used EAP authentication methods for 802.1X, and is a manner for protecting weaker identity authentication with TLS encryption.

Of course, it should be understood by those skilled in the art that the above-mentioned PAP, TTLS, etc. are merely examples, and other existing or future possible manners, if applicable to the present application, should also be included in the scope of the present application, and hereby are incorporated by reference herein.

Figure 4:
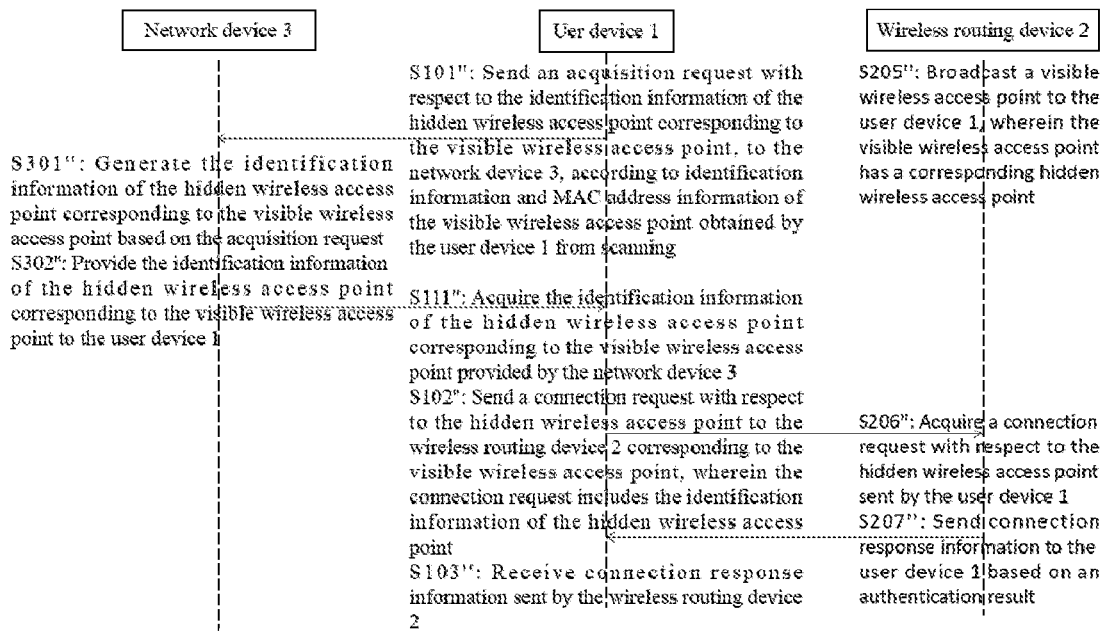
FIG. 4 illustrates a schematic flowchart of a method for connecting to a hidden wireless access point according to further another embodiment of the present application.

Preferably, as shown in FIG. 4, in step S101", the user device 1 sends an acquisition request with respect to the identification information of the hidden wireless access point corresponding to the visible wireless access point, to the network device 3, according to identification information and MAC address information of the visible wireless access point obtained by scanning. In step S301", the network device 3 generates the identification information of the hidden wireless access point corresponding to the visible wireless access point based on the acquisition request. In step S302", the network device 3 provides the identification information of the hidden wireless access point corresponding to the visible wireless access point to the user device 1. In step S111", the user device 1 acquires the identification information of the hidden wireless access point corresponding to the visible wireless access point provided by the network device 3.

In the present embodiment, the identification information of the hidden wireless access point corresponding to the visible wireless access point is generated by the network device 3. For example, the network device 3 may store a mapping table of a mapping relationship between identification information of the visible wireless access point and the hidden wireless access point. When the network device 3 receives the acquisition request sent by the user device 1, the identification information of the hidden wireless access point corresponding to the visible wireless access point is obtained by querying the mapping table.

According to another aspect of the present application, there is provided a system for connecting to a hidden wireless access point, including the user device 1 as described above and the wireless routing device 2 as described above.

According to further still another aspect of the present application, there is provided a method for connecting to a hidden wireless access point, wherein the method includes:

broadcasting, by a wireless routing device, a visible wireless access point to a user device, wherein the visible wireless access point has a corresponding hidden wireless access point;

acquiring, by the user device, identification information of the hidden wireless access point corresponding to the visible wireless access point according to identification information and MAC address information of the visible wireless access point obtained by scanning;

sending, by the user device, a connection request with respect to the hidden wireless access point to the wireless routing device corresponding to the visible wireless access point, wherein the connection request includes the identification information of the hidden wireless access point;

acquiring, by the wireless routing device, the connection request with respect to the hidden wireless access point sent by the user device;

based on an authentication result, sending, by the wireless routing device, connection response information to the user device; and receiving, by the user device, the connection response information sent by the wireless routing device.

According to yet another aspect of the present application, there is provided a method for displaying a hidden wireless access point, wherein the method includes:

broadcasting, by a wireless routing device, a visible wireless access point to a user device, wherein the visible wireless access point has a corresponding hidden wireless access point;

acquiring, by the user device, identification information of the hidden wireless access point corresponding to the visible wireless access point according to identification information and MAC address information of the visible wireless access point obtained by scanning; and displaying, by the user device, the identification information of the hidden wireless access point.

In the present embodiment, the visible wireless access point includes a wireless access point with a visible SSID, and the hidden wireless access point includes a wireless access point that hides the SSID. The wireless routing device 2 broadcasts the visible wireless access point, and at the same time, the wireless routing device 2 also provides the hidden wireless access point, wherein there is an association relationship between the visible wireless access point and the hidden wireless access point.

A user opens a specific application (e.g. an application corresponding to the wireless routing device 2) on the user device 1, and the specific application acquires identification information (e.g. an SSID) and MAC address information (e.g. a BSSID) of the visible wireless access point obtained by the user device 1 from scanning. Then, the specific application generates identification information (e.g. an SSID) of the hidden wireless access point corresponding to the visible wireless access point according to the association relationship between the visible wireless access point and the hidden wireless access point locally stored by the user device 1. In a preferred embodiment, the identification information of the hidden wireless access point may further include tag information for indicating classification or content of an identified object. For example, an "extreme speed" tag may be added to the hidden wireless access point in the specific application.

Then, the identification information of the hidden wireless access point is displayed in the specific application, and the user may select to connect or not to connect to the hidden wireless access point.

Preferably, the user device 1 sends an acquisition request with respect to identification information of a hidden wireless access point corresponding to a visible wireless access point to the network device 3, according to identification information and MAC address information of the visible wireless access point obtained by scanning. The network device 3 generates the identification information of the hidden wireless access point corresponding to the visible wireless access point based on the acquisition request. The network device 3 provides the identification information of the hidden wireless access point corresponding to the visible wireless access point to the user device 1. The user device 1 acquires the identification information of the hidden wireless access point corresponding to the visible wireless access point provided by the network device 3.

In the present embodiment, the identification information of the hidden wireless access point corresponding to the visible wireless access point is generated by the network device 3. For example, the network device 3 may store a mapping table of a mapping relationship between identification information of the visible wireless access point and the hidden wireless access point. When the network device 3 receives the acquisition request sent by the user device 1, the identification information of the hidden wireless access point corresponding to the visible wireless access point is obtained by querying the mapping table.

According to further still another aspect of the present application, there is provided a computer readable medium comprising instructions that, when executed, cause a system to perform operations of the method as described above.

According to further still another aspect of the present application, there is provided a user device for connecting to a hidden wireless access point, wherein the user device includes:

a processor; and a memory configured to store computer executable instructions that, when executed, cause the processor to perform the method as described above.

According to further still another aspect of the present application, there is provided a wireless routing device for connecting a hidden wireless access point, wherein the wireless routing device includes:

a processor; and a memory configured to store computer executable instructions that, when executed, cause the processor to perform the method as described above.

Compared with the prior art, the wireless routing device of the present application broadcasts a visible wireless access point to the user device, and the wireless access point has a corresponding hidden wireless access point; the user device obtains identification information and MAC address information of the visible wireless access point by scanning, and thereby acquires identification information of the hidden wireless access point corresponding to the visible wireless access point; and then, the user device may send a connection request with respect to the hidden wireless access point to the wireless routing device, and if the connection request is successfully authenticated, the user device may be successfully connected to the hidden wireless access point. The present application simplifies user operations, which is convenient for users to connect to the hidden wireless access point, and optimizes user experience. Further, the present application may display the identification information of the hidden wireless access point for the users to select to connect or not to connect to the hidden wireless access point, which is convenient for the users to connect to the hidden wireless access point and also respects the users' autonomous selection to enhance the user experience.

It should be noted that the present application may be implemented in software and/or a combination of software and hardware. For example, an application specific integrated circuit (ASIC), a general purpose computer or any other similar hardware device may be used for the implementation. In an embodiment, a software program of the present application may be executed by a processor to implement the steps or functions described above. Likewise, the software program (including relevant data structures) of the present application may be stored in a computer readable recording medium such as a RAM memory, a magnetic or optical drive or a floppy disk and the like. In addition, some of the steps or functions of the present application may be implemented by using hardware, for example, a circuit that cooperates with a processor to perform various steps or functions.

In addition, a part of the present application may be applied as a computer program product, such as computer program instructions, which when executed by a computer, may invoke or provide a method and/or a technical solution according to the present application through computer operations. It should be understood by those skilled in the art that the form of computer program instructions in a computer readable medium includes, but is not limited to, a source file, an executable file, an installation package file, etc., and correspondingly, the manner in which the computer program instructions are executed by the computer includes but is not limited to: the computer directly executing the instructions, or the computer compiling the instructions and then executing a corresponding compiled program, or the computer reading and executing the instructions, or the computer reading and installing the instructions and then executing a corresponding installation program. Herein, the computer readable medium may be any available computer readable storage medium or communication medium accessible by a computer.

The communication medium includes a medium by which communication signals including, for example, computer readable instructions, data structures, program modules or other data, are transferred from one system to another system. The communication medium may include a guided transmission medium such as a cable and a wire (e.g. an optical fiber, a coaxial line, etc.), and a wireless (unguided transmission) medium capable of propagating energy waves, such as acoustic, electromagnetic, RF, microwave, and infrared waves. The computer readable instructions, data structures, program modules or other data may be embodied, for example, as modulated data signals in a wireless medium (such as a carrier wave or a similar mechanism embodied as a part of a spread spectrum technique). The term "modulated data signal" refers to a signal whose one or more features are altered or set in such a manner as to encode information in the signal. Modulation may be analog, digital or hybrid modulation techniques.

By way of example and not limitation, the computer readable storage medium may include volatile and non-volatile media and removable and non-removable media implemented in any method or technology for storing information such as computer readable instructions, data structures, program modules or other data. For example, the computer readable storage medium includes, but is not limited to: a volatile memory, such as a random access memory (RAM, DRAM and SRAM); and a non-volatile memory such as a flash memory, various read-only memories (ROM, PROM, EPROM and EEPROM), and magnetic and ferromagnetic/ferroelectric memories (MRAM and FeRAM); and magnetic and optical storage devices (a hard disk, a magnetic tape, a CD and a DVD); or other media now known or developed in the future for storing computer readable information/data for use by a computer system.

It would be obvious to those skilled in the art that the present application is not limited to the details of the above-described exemplary embodiments, and the present application can be implemented in other specific forms without departing from the spirit or essential features of the present application. Therefore, no matter which point of view is chosen, the present embodiments are to be considered as illustrative and not restrictive, and the scope of the present application is defined by the appended claims instead of the above description. Therefore, it is intended that all changes falling within the meaning and scope of equivalent elements of the claims are covered in the present application. Any reference numerals in the claims should not be construed as limiting the claims. In addition, it is obvious that the words "comprising", "comprises", "comprised", "including", "includes", or "included" do not exclude other units or steps, and the singular form does not exclude the plural form. The words "first", "second", etc., are used to denote the names and do not denote any particular order.

What is claimed is:

1. A method for connecting to a hidden wireless access point on a user device end, comprising:
    acquiring identification information of the hidden wireless access point corresponding to a visible wireless access point according to the identification information and MAC address information of the visible wireless access point obtained by a user device from scanning;
    wherein the step of acquiring identification information of the hidden wireless access point corresponding to the visible wireless access point according to identification information and MAC address information of the visible wireless access point obtained by the user device from scanning, comprises:
    determining, according to identification information and MAC address information of the visible wireless access point obtained by the user device from scanning, whether the visible wireless access point has a corresponding hidden wireless access point or not; and
    generating identification information of the hidden wireless access point according to identification information and MAC address information of the visible wireless access point when the visible wireless access point has the corresponding hidden wireless access point;
    sending a connection request with respect to the hidden wireless access point to a wireless routing device corresponding to the visible wireless access point, wherein, the connection request comprises the identification information of the hidden wireless access point; and
    receiving connection response information from the wireless routing device in response to the connection request.

2. The method according to claim 1, further comprising:
    displaying the identification information of the hidden wireless access point; and
    wherein, the step of sending the connection request with respect to the hidden wireless access point to the wireless routing device corresponding to the visible wireless access point is performed when a connection operation of a user with respect to the hidden wireless access point is obtained.

3. The method according to claim 1, wherein, the step of determining, according to the identification information and the MAC address information of the visible wireless access point obtained by the user device from scanning, whether the visible wireless access point has the corresponding hidden wireless access point or not, comprises:
    determining identity feature information of the visible wireless access point according to the identification information and the MAC address information of the visible wireless access point obtained by the user device from scanning; and determining, according to the identity feature information of the visible wireless access point, whether the visible wireless access point has the corresponding hidden wireless access point or not.

4. The method according to claim 3, wherein, the step of generating the identification information of the hidden wireless access point according to the identification information and the MAC address information of the visible wireless access point when the visible wireless access point has the corresponding hidden wireless access point, comprises:
when the visible wireless access point has the corresponding hidden wireless access point, determining a generative rule of the hidden wireless access point according to the identity feature information of the visible wireless access point; and
wherein the step of generating the identification information of the hidden wireless access point, further comprises generating the identification information of the hidden wireless access point according to the identification information, the MAC address information of the visible wireless access point and the generative rule of the hidden wireless access point.

5. The method according to claim 1, wherein, the step of acquiring the identification information of the hidden wireless access point corresponding to the visible wireless access point, comprises:
sending, to a network device, an acquisition request with respect to the identification information of the hidden wireless access point corresponding to the visible wireless access point; and
acquiring the identification information of the hidden wireless access point corresponding to the visible wireless access point provided by the network device.

6. A method for connecting to a hidden wireless access point on a wireless routing device end, comprising:
broadcasting a visible wireless access point to a user device, wherein, the visible wireless access point has a corresponding hidden wireless access point;
acquiring a connection request with respect to the hidden wireless access point sent by the user device, wherein, the connection request includes identification information of the hidden wireless access point;
acquiring, from the connection request of the user device, identification information of the hidden wireless access point corresponding to the visible wireless access point according to identification information and MAC address information of the visible wireless access point;
wherein the step of acquiring, from the connection request of the user device, identification information of the hidden wireless access point corresponding to the visible wireless access point according to identification information and MAC address information of the visible wireless access point comprises:
determining, according to the identification information and the MAC address information of the visible wireless access point obtained from the user device, whether the visible wireless access point has a corresponding hidden wireless access point or not; and
generating an authentication request based on the identification information of the hidden wireless access point according to identification information and MAC address information of the visible wireless access point when the visible wireless access point has the corresponding hidden wireless access point; and
sending connection response information to the user device based on an authentication result.

7. The method according to claim 6, further comprising:
sending the authentication request with respect to the connection request to a corresponding network device; and
receiving the authentication result with respect to the connection request returned by the network device.

8. A method for displaying a hidden wireless access point, comprising:
broadcasting, by a wireless routing device, a visible wireless access point to a user device, wherein, the visible wireless access point has a corresponding hidden wireless access point;
acquiring, by the user device, identification information of the hidden wireless access point corresponding to the visible wireless access point according to identification information and MAC address information of the visible wireless access point obtained by scanning; and
wherein the step of acquiring, by the user device, identification information of the hidden wireless access point corresponding to the visible wireless access point according to identification information and MAC address information of the visible wireless access point obtained by scanning, comprises:
determining, according to identification information and MAC address information of the visible wireless access point obtained by the user device from scanning, whether the visible wireless access point has a corresponding hidden wireless access point or not; and
generating identification information of the hidden wireless access point according to identification information and MAC address information of the visible wireless access point when the visible wireless access point has the corresponding hidden wireless access point;
displaying, by the user device, the identification information of the hidden wireless access point.

9. The method according to claim 8, wherein, the step of acquiring the identification information of the hidden wireless access point corresponding to the visible wireless access point according to the identification information and the MAC address information of the visible wireless access point obtained by the user device from scanning, comprises:
determining, according to the identification information and the MAC address information of the visible wireless access point obtained by the user device from scanning, whether the visible wireless access point has a corresponding hidden wireless access point or not; and
generating the identification information of the hidden wireless access point according to the identification information and the MAC address information of the visible wireless access point if the visible wireless access point has the corresponding hidden wireless access point.

10. The method according to claim 9, wherein, the step of determining, according to the identification information and the MAC address information of the visible wireless access point obtained by the user device from scanning, whether the visible wireless access point has the corresponding hidden wireless access point or not, comprises:
determining identity feature information of the visible wireless access point according to the identification information and the MAC address information of the visible wireless access point obtained by the user device from scanning; and
determining, according to the identity feature information of the visible wireless access point, whether the visible wireless access point has the corresponding hidden wireless access point or not.

11. The method according to claim 10, wherein, the step of generating the identification information of the hidden wireless access point according to the identification information and the MAC address information of the visible wireless access point when the visible wireless access point has the corresponding hidden wireless access point, comprises:
- when the visible wireless access point has the corresponding hidden wireless access point, determining a generative rule of the hidden wireless access point according to the identity feature information of the visible wireless access point; and
- generating the identification information of the hidden wireless access point according to the identification information, the MAC address information of the visible wireless access point and the generative rule of the hidden wireless access point.

* * * * *